United States Patent
Maniloff et al.

(10) Patent No.: US 12,381,624 B2
(45) Date of Patent: Aug. 5, 2025

(54) SIGNAL-TO-NOISE RATIO-BASED BIT ERROR RATIO CALCULATION FOR REPORTING BEYOND A FORWARD ERROR CORRECTION THRESHOLD

(71) Applicant: Ciena Corporation, Hanover, MD (US)

(72) Inventors: Eric Maniloff, Woodlawn (CA); Christian Bourget, Stittsville (CA); Hoang-Bao Le Van, Kanata (CA); Marc Veilleux, Ottawa (CA); Steven Clarke, Ottawa (CA)

(73) Assignee: Ciena Corporation, Hanover, MD (US)

( * ) Notice: Subject to any disclaimer, the term of this patent is extended or adjusted under 35 U.S.C. 154(b) by 281 days.

(21) Appl. No.: 18/342,610

(22) Filed: Jun. 27, 2023

(65) Prior Publication Data
US 2025/0007606 A1  Jan. 2, 2025

(51) Int. Cl.
*H04B 10/079* (2013.01)
*H04L 1/00* (2006.01)

(52) U.S. Cl.
CPC ..... *H04B 10/07953* (2013.01); *H04L 1/0045* (2013.01)

(58) Field of Classification Search
CPC .................................................. H04B 10/07953
USPC ....................................................... 398/25–27
See application file for complete search history.

(56) References Cited

U.S. PATENT DOCUMENTS

| | | | |
|---|---|---|---|
| 6,111,676 A | 8/2000 | Lemus et al. | |
| 6,313,771 B1 | 11/2001 | Munroe et al. | |
| 6,404,806 B1 | 6/2002 | Ginesi et al. | |
| 6,456,654 B1 | 9/2002 | Ginesi et al. | |
| 6,594,421 B1 | 7/2003 | Johnson et al. | |
| 6,778,102 B1 | 8/2004 | Grunnet-Jepsen et al. | |
| 6,810,210 B1 | 10/2004 | Veilleux et al. | |
| 6,845,082 B2 | 1/2005 | Bourget et al. | |
| 6,865,344 B1 | 3/2005 | Johnson et al. | |
| 7,065,298 B1 | 6/2006 | Munroe et al. | |

(Continued)

FOREIGN PATENT DOCUMENTS

| | | |
|---|---|---|
| CA | 2404020 A1 | 10/2001 |
| CA | 2375823 A1 | 9/2003 |

(Continued)

OTHER PUBLICATIONS

Lun et al., "Machine-learning-based telemetry for monitoring long-haul optical transmission impairments: methodologies and challenges," Journal of Optical Communications and Networking, Research Article, vol. 13, No. 10, Oct. 2021, pp. 94-108 (Year: 2021).*

(Continued)

*Primary Examiner* — Li Liu
(74) *Attorney, Agent, or Firm* — Baratta Law PLLC; Lawrence A. Baratta, Jr.

(57) ABSTRACT

Signal-to-noise ratio (SNR)-based bit error ratio (BER) calculations for reporting beyond a forward error correction (FEC) threshold include measuring signal-to-noise ratio (SNR) of a first signal; extrapolating the SNR of a first signal to determine an SNR of a second signal; and determining a pre-FEC bit error rate (BER) for the second signal based on the determined SNR of the second signal. The process can further include reporting the determined pre-FEC BER. The measuring and extrapolating can be used when the second signal is beyond the FEC threshold.

17 Claims, 8 Drawing Sheets

(56) References Cited

U.S. PATENT DOCUMENTS

| | | |
|---|---|---|
| 7,433,603 B2 | 10/2008 | Johnson et al. |
| 8,306,438 B2 | 11/2012 | Deczky et al. |
| 8,424,247 B2 | 4/2013 | Bourget |
| 8,433,192 B2 | 4/2013 | Frankel et al. |
| 8,498,542 B2 | 7/2013 | Frankel et al. |
| 9,490,894 B2 | 11/2016 | Gaudette et al. |
| 9,806,801 B2 | 10/2017 | Maniloff et al. |
| 9,882,634 B1 | 1/2018 | Al Sayeed et al. |
| 10,334,539 B2 | 6/2019 | Swinkels et al. |
| 10,348,410 B1 | 7/2019 | Charlton et al. |
| 10,396,891 B2 | 8/2019 | Maniloff et al. |
| 10,637,604 B2 | 4/2020 | Gareau et al. |
| 10,877,230 B1 | 12/2020 | Graham et al. |
| 10,979,139 B1 | 4/2021 | Ibach et al. |
| 11,336,367 B1 | 5/2022 | Oveis Gharan et al. |
| 11,502,747 B2 | 11/2022 | Delezoide et al. |
| 2002/0114998 A1 | 8/2002 | Maniloff et al. |
| 2003/0058497 A1 | 3/2003 | Park et al. |
| 2003/0117695 A1 | 6/2003 | Paquet et al. |
| 2003/0142390 A1 | 7/2003 | Parry et al. |
| 2004/0008565 A1 | 1/2004 | Johnson et al. |
| 2004/0013075 A1 | 1/2004 | Johnson et al. |
| 2004/0208432 A1 | 10/2004 | Mak et al. |
| 2008/0062975 A1 | 3/2008 | Mes et al. |
| 2008/0089402 A1* | 4/2008 | Massey ............... H04B 17/309 375/227 |
| 2008/0222594 A1 | 9/2008 | Maniloff et al. |
| 2011/0182574 A1* | 7/2011 | Peng .................... H04B 10/695 398/202 |
| 2017/0207849 A1 | 7/2017 | Sinclair et al. |
| 2018/0167160 A1 | 6/2018 | Gareau et al. |
| 2019/0036600 A1 | 1/2019 | Jiang et al. |
| 2020/0021358 A1* | 1/2020 | Maccaglia .............. H04L 43/16 |
| 2020/0271878 A1 | 8/2020 | Maniloff et al. |
| 2021/0176542 A1 | 6/2021 | Frankel et al. |
| 2021/0405314 A1 | 12/2021 | Wingrove et al. |
| 2022/0116110 A1* | 4/2022 | Delezoide ............ H04B 17/336 |
| 2023/0012193 A1* | 1/2023 | Yin ......................... H04L 1/203 |
| 2023/0127848 A1 | 4/2023 | Maniloff et al. |

FOREIGN PATENT DOCUMENTS

| | | |
|---|---|---|
| CA | 3176508 A1 | 9/2022 |
| EP | 3057250 A1 | 10/2019 |
| WO | 2003079594 A9 | 6/2004 |
| WO | 2020231877 A1 | 11/2020 |

OTHER PUBLICATIONS

Curri et al, "GNPy Model for Design of Open and Disaggrefated Optical Networks," Optcom, planet.polito.it, Sep. 13-16, 2021, pp. 1-86 (Year: 2021).*

Huazhi Lun et al., "Machine-learning-based telemetry for monitoring long-haul optical transmission impairments: methodologies and challenges," Journal of Optical Communications and Networking, Research Article, vol. 13, No. 10, Oct. 2021, pp. 94-108.

Vittorio Curri, "GNPy Model for Design of Open and Disaggrefated Optical Networks," Optcom, planet.polito.it, Sep. 13-16, 2021, pp. 1-86.

Sep. 27, 2024, International Search Report and Written Opinion for International Patent Application No. PCT/US2024/035581.

* cited by examiner

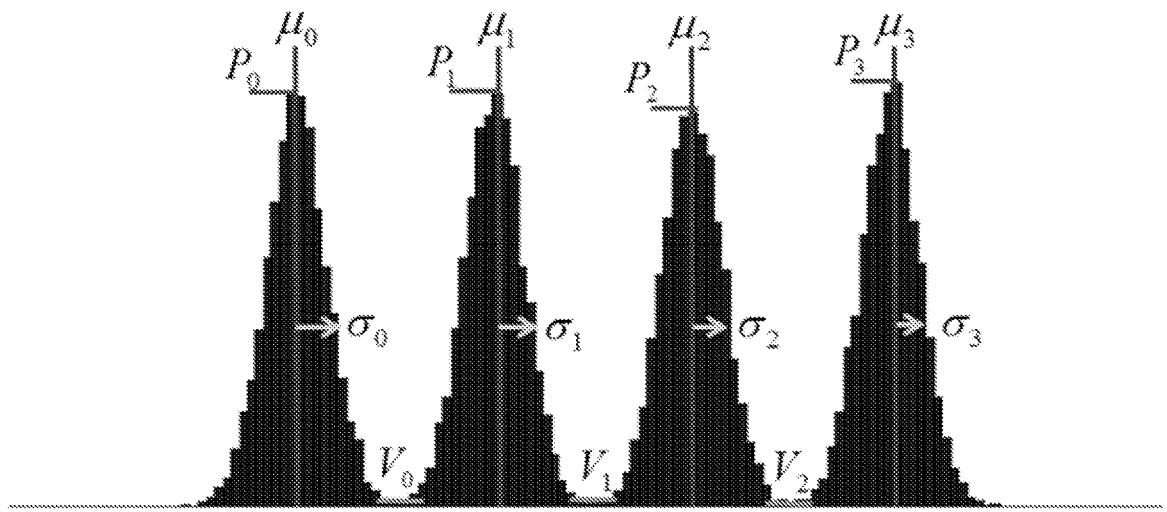

Figure 7-2 PAM4 amplitude histogram

The histogram x-axis is in bins and the y-axis is in number of bin hits. The number of bins and the hit count magnitude is vendor specific. The histogram is taken at the point in where data is converted from analog to digital. The PAM4 slicer determines the best decision thresholds for slicing the data. The peaks are the bins with the largest number of hits between any two valleys (or below valley 1/above valley 3 for the first and last peaks). The valley location corresponds to the decision thresholds determined by the slicer.

The calculations for the reported eye parameters SNR and LTP are:

SNR = $10 * \log_{10}(\min\{SNR_0, SNR_1, SNR_2\})$ where $SNR_i = (\mu_{i+1} - \mu_i)/(\sigma_{i+1} + \sigma_i)$, expressed in 1/256 dB units LTP = $10 * \log_{10}(\min\{LTP_0, LTP_1, LTP_2\})$ where $LTP_i = (P_{i+1} + P_i)/(2V_i)$, expressed in 1/256 dB units

*FIG. 10*

SIGNAL-TO-NOISE RATIO-BASED BIT ERROR RATIO CALCULATION FOR REPORTING BEYOND A FORWARD ERROR CORRECTION THRESHOLD

FIELD OF THE DISCLOSURE

The present disclosure relates generally to networking and computing. More particularly, the present disclosure relates to systems and methods for signal-to-noise ratio (SNR)-based bit error ratio (BER) calculations in place of conventional BER measurement.

BACKGROUND OF THE DISCLOSURE

Forward Error Correction (FEC) utilizes redundancy at a transmitter, namely adding data, i.e., the redundancy, based on a particular algorithm, such that a receiver can process the received data, including information bits and the redundancy, to correct a given level of errors. FEC is used on optical and/or electrical interfaces, in order to allow operation at SNR values consistent with the high data rates (e.g., 100 Gb/s and beyond) required for current technologies. FEC allows operation at lower SNRs than would be otherwise possible for current data rates.

BRIEF SUMMARY OF THE DISCLOSURE

The present disclosure relates to systems and methods for signal-to-noise ratio (SNR)-based bit-error ratio calculations. Networking equipment is configured to report pre-FEC BER to end users and this conventionally involves a calculation where a received signal is analyzed to determine the overall bits and the overall corrected bits, yielding a BER which is a useful metric to describe current operation on a link. However, once a link operates above a so-called FEC threshold (or FEC limit), where the FEC is no longer able to correct all of the incoming errors, the reporting of the pre-FEC BER is not provided. This makes sense since it is not possible to accurately determine the pre-FEC BER above the FEC threshold. In some instances in which FEC is not terminated at an intermediate interface, BER is not able to be measured using conventional corrected-bit or symbol counting methods In various embodiments, the present disclosure includes reporting of the pre-FEC BER beyond the FEC threshold as well as measurement of BER on interfaces where the FEC is either not terminated or is partially terminated. This is based on utilization of the SNR to determine the BER. In an embodiment, an optical link includes dual-polarization (X and Y) coherent modulated signal. The present disclosure includes per polarization values of the SNR to determine the BER. In an embodiment, above the FEC threshold, the SNR can be determined utilizing pilot and training symbols in a coherent modulation constellation. These pilot and training symbols are used for framing at low SNR values and training. Importantly, these pilot and training symbols support much lower SNR operation, and the SNR can be determined after the FEC threshold is reached. In another embodiment, a similar approach of utilizing SNR to determine pre-FEC BER can be used on electrical interfaces.

Advantageously, reporting of the pre-FEC BER beyond the FEC threshold has high utility in engineering and operation of real networks. This can give a network operator a sense of link viability; if the link will not acquire but the reported pre-FEC BER is close to the threshold, then potentially with some minor adjustments, the link can be made to carry traffic error-free. If the reported pre-FEC BER is much higher than the threshold, then a deeper investigation may be needed. This provides real-time insight to link viability, and this approach can be extended with the determination and reporting of other link parameters such as chromatic dispersion and polarization dependent loss, to indicate why the link has exceeded the pre-FEC BER threshold. Also, the present disclosure can be used to characterize/measure a link's qualities, e.g., estimate the dispersion, polarization dependent loss (PDL), differential group delay (DGD), estimate delivered SNR, etc., even if the link cannot meet the required performance to carry live traffic.

In an embodiment, a receiver includes circuitry configured to measure signal-to-noise ratio (SNR) of a first signal, extrapolate the SNR of the first signal to determine an SNR of a second signal, and determine a pre-forward error correction (FEC) bit error ratio (BER) for the second signal based on the determined SNR of the second signal. The SNR can be measured of the first signal and extrapolated to the second signal responsive to the second signal being beyond a FEC threshold, to determine the pre-FEC BER for the second signal. The circuitry can be further configured to report the determined pre-FEC BER. The circuitry can be further configured to determine an estimate of optical link parameters including any of chromatic dispersion (CD), polarization dependent loss (PDL), and differential group delay (DGD) of the first signal, and report the estimate of optical link parameters.

The circuitry can be further configured to, responsive to the determined pre-FEC BER being at or near the FEC threshold, report the determined pre-FEC BER such that one or more adjustments are performed to attempt to reach or operate below the FEC threshold. The first signal can include a concatenated FEC with the pre-FEC BER being a measurement associated with an inner code of the concatenated FEC. The received signal can be a coherent optical signal, the first signal can be a pilot or training signal associated with the coherent optical signal, and the second signal can be a data signal for the coherent optical signal. The pilot or training signal has a reduced number of symbols from the data signal.

The coherent optical signal can include two polarizations including an X polarization and a Y polarization, and wherein the circuitry cam ne further configured to determine the pre-FEC BER for each of the two polarizations, and one or more (1) combine the pre-FEC BER for each of the two polarizations and (2) report each of the pre-FEC BER for each of the two polarizations. The received signal can be an electrical signal utilizing pulse amplitude modulation (PAM), and the first signal and the second signal are both the electrical signal. The received signal can be an electrical signal, and the measured SNR is from a histogram of a received electrical signal. The circuitry can be further configured to, responsive to the second signal being below the FEC threshold, determine the pre-FEC BER based on total received bits and total corrected errors.

In another embodiment, a method includes steps of measuring signal-to-noise ratio (SNR) of a first signal; extrapolating the SNR of a first signal to determine an SNR of a second signal; and determining a pre-forward error correction (FEC) bit error ratio (BER) for the second signal based on the determined SNR of the second signal. The steps can further include reporting the determined pre-FEC BER. The steps can further include determining an estimate of optical link parameters including any of chromatic dispersion (CD), polarization dependent loss (PDL), and differential group delay (DGD) of the first signal; and reporting the estimate of optical link parameters.

The steps can further include, responsive to the determined pre-FEC BER being at or near the FEC threshold, reporting the determined pre-FEC BER and one or more adjustments to perform to attempt to reach or operate below the FEC threshold. The received signal can be a coherent optical signal, the first signal can be a pilot or training signal associated with the coherent optical signal, and the second signal can be a data signal for the coherent optical signal. The coherent optical signal can include two polarizations including an X polarization and a Y polarization, and wherein the steps can further include determine the pre-FEC BER for each of the two polarizations, and one or more (1) combine the pre-FEC BER for each of the two polarizations and (2) report each of the pre-FEC BER for each of the two polarizations.

In a further embodiment, a transceiver includes circuitry configured to receive and process a signal with forward error correction (FEC), measure or determine the pre-FEC bit error ratio (BER), wherein the pre-FEC BER is measured in a first regime above a FEC threshold and determined in a second regime below the FEC threshold, and provide the pre-FEC BER for reporting. The transceiver can utilize coherent modulation where the pre-FEC BER is determined in the second regime based on measuring a constellation BER where the constellation is smaller than a constellation of the signal and extrapolating the pre-FEC BER therefrom.

BRIEF DESCRIPTION OF THE DRAWINGS

The present disclosure is illustrated and described herein with reference to the various drawings, in which like reference numbers are used to denote like system components/method steps, as appropriate, and in which:

FIG. 10 is a diagram of a PAM4 amplitude histogram and approach for determining SNR therefrom.

DETAILED DESCRIPTION OF THE DISCLOSURE

Again, the present disclosure relates to systems and methods for signal-to-noise ratio (SNR)-based bit error rate calculations for reporting BER in place of conventional corrected error counting techniques.

Communication Links

Figure 1:
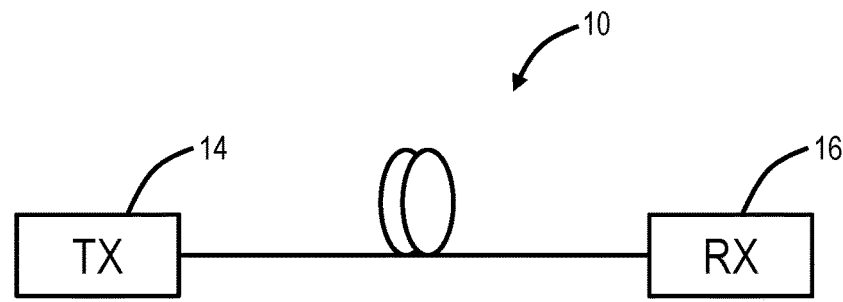
FIG. 1 includes two example communication links, including an optical link between a transmitter and a receiver, and an electrical link between the receiver and a backplane.
Figure 1:
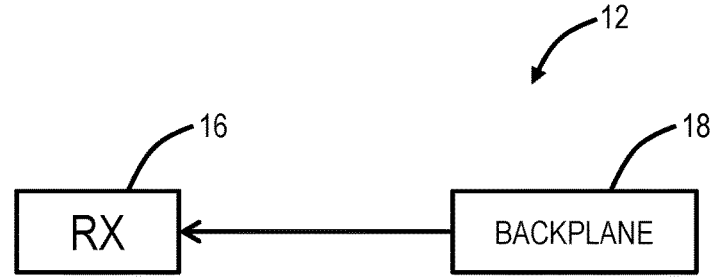

FIG. 1 includes two example communication links 10, 12, including an optical link 10 between a transmitter 14 and a receiver 16, and an electrical link 12 between the receiver 16 and a backplane 18. Both communication links 10, 12 are shown in a unidirectional configuration; of course, a practical embodiment includes bidirectional communication. The optical link 10 is between optical modems, also referred to as transceivers, transmitters and receivers, pluggable modules, etc. The transmitter 14 is configured to modulate an optical signal, via a modulation format, including non-return-to-zero (NRZ), pulse amplitude modulation (PAM), or coherent modulation (e.g., quadrature amplitude modulation (QAM) and the like), as well as polarization multiplexing. The optical link 10 can support various baud rates through software-programmable modulation formats. The electrical link 12 provides communication over electrical interfaces, e.g., backplane connectors, electrical pluggable modules such as QSFP-DD, etc. In an embodiment, the electrical link 12 can support PAM4. The backplane 18 can be any electrical receiver, including one in a pluggable module, interface connectors on a printed circuit board, etc.

In an embodiment, the optical link 10 can utilize forward error correction including Hard Decision FEC implementations and Soft Decision FEC (SD-FEC), as another technique to trade-off complexity versus noise tolerance. In another embodiment, the electrical link 12 can support FEC as well. In a further embodiment, the FEC can be on both the optical link 10 and the electrical link 12, namely both links 10, 12 share the same FEC.

FEC

FEC is used on optical and electrical interfaces, i.e., the links 10, 12, in order to allow operation at SNR values consistent with the high data-rates required for current technologies, e.g., 100 Gb/s and beyond. FEC allows operation at lower SNRs than would be otherwise possible for current data-rates. In general, an interface operating with FEC can operate at a high pre-FEC BER while meeting the post-FEC requirements for data transmission (typically $1 \times 10^{-12}$ to $1 \times 10^{-15}$).

In standards implementations, a FEC threshold is typically defined, based on a pre and post FEC BER. As described herein, the FEC threshold (which can also be referred to as the pre-FEC BER threshold, FEC limit, etc.) is a value of BER below which the post FEC BER is met, and above which the FEC cannot meet the post-FEC BER requirement. That is, the FEC threshold is a maximum BER for the particular FEC to meet the link BER requirement. In many cases, the post FEC BER versus pre-FEC BER curve is very steep near the FEC threshold, transitioning rapidly from the region where the post FEC BER is <$1 \times 10^{-15}$ to the region in which all FEC codewords are errored.

Again, interfaces typically measure the pre-FEC BER by measuring the corrected bits and total bits across FEC codewords. This approach works assuming all FEC codewords are corrected. However, an uncorrected codeword does not provide information on its input BER. This causes BER estimates close to the FEC threshold to become inaccurate, and results in no BER estimate for a pre-FEC BER>the FEC threshold.

The present disclosure notes that, when an interface is operating beyond the FEC threshold, it is useful to know the pre-FEC BER, to determine how close the interface is to the FEC threshold. Such reporting requires knowledge of the FEC limit (either theoretical or practical) for the comparison. As described herein, a link 10, 12 may be close to the FEC threshold, and there are various options to potentially bring the link 10, 12 below the FEC threshold.

Standards such as those from IEE, ITU, and OIF define the FEC threshold. For example, in the Optical Internetworking Forum (OIF) OIF-400ZR-2.0 Implementation Agreement, Nov. 3, 2022, the contents of which are incorporated herein in their entirety, Concatenated FEC (CFEC) is used with a FEC threshold of $1.25 \times 10^{-2}$ corresponding to a post FEC BER of $1 \times 10^{-15}$. In another example, in the International Telecommunication Union (ITU) Recommendation G.709.2/Y.1331.2, "OTU4 long-reach interface," (July 2018), a hard-decision (HD) staircase FEC is defined with a FEC threshold of $4.5 \times 10^{-3}$. For an example electrical link, IEEE 802.3bj-2014," IEEE Standard for Ethernet Amendment 2: Physical Layer Specifications and Management Parameters for 100 Gb/s Operation Over Backplanes and Copper Cables, describes an example backplane electrical interface using PAM4 having a FEC with a FEC threshold of about $2.2 \times 10^{-5}$. Those skilled in the art will recognize there are various other standards specifying FEC in different protocols on associated interfaces, all of which are contemplated herewith. A key aspect of FEC and the FEC threshold is that the pre-FEC BER is a useful performance monitoring (PM) metric, one that is conventionally computed or determined while the interface is operating below the FEC threshold, and one that is reported to an operator.

In some instances FEC is applied in an external ASIC and is applied to multiple segments of a link. For example, the FEC may cover one or more segments, consisting of electrical or optical transmission. The FEC may be added and have allocations of its correction capability to multiple electrical links, or to electrical as well as optical links. In these scenarios a pre-FEC BER specification is applied to the various segments, but cannot be measured at intermediate interfaces. By using an SNR to BER conversion, it is possible to determine the operating BER of each interface.

FEC Reporting

Since standards such as those from IEEE, ITU, and OIF define specifications based on BER, the present disclosure includes expanding the reporting range beyond the FEC threshold. That is, conventionally, at or above the FEC threshold, optical or electrical transceivers do not report a pre-FEC BER value. This makes sense since it is not possible to calculate the pre-FEC BER value beyond the FEC threshold. That is, any calculation or determination would be inaccurate as the number of corrected bits is not accurate beyond the FEC threshold. In an embodiment, the present disclosure includes the ability to report an accurate pre-FEC BER beyond the FEC threshold. In another embodiment, the present disclosure provides techniques for determination of the accurate pre-FEC BER.

This reporting ability and subsequent use by a network operator, technician, etc. adds significant value; rather than simply reporting that a link has failed (FEC is overflowed) an interface can report how close it is to passing. This can give the operator a sense of link viability; if the reported pre-FEC BER is close to the threshold, then potentially with some minor adjustments the link can be made to carry traffic error-free. These minor adjustments can include, e.g., cleaning fiber connectors, changing transmit power levels, reducing lengths of fiber connections (e.g., patch cords), changing the patch cords, etc. That is, minor adjustments are typical and used in operations all the time; however, there is no indication that such adjustments may be useful without reporting of the pre-FEC BER and determination it is close to the FEC threshold. If the reported pre-FEC is much higher than the threshold, then a deeper investigation may be needed. That is, there may be a need for a different transceiver, different modulation format, etc.

The present disclosure provides real-time insight to link viability with the reporting of pre-FEC BER beyond the FEC threshold. In addition, this reporting can be extended to other performance monitoring metrics, e.g., optical link parameters or qualities such as chromatic dispersion (CD), polarization dependent loss (PDL), differential group delay (DGD), estimated SNR, etc. The determination and reporting of these optical link parameters can be used to indicate or determine why the link has exceeded the pre-FEC BER threshold, including whether it is possible to move to error-free transmission with the minor adjustments.

BER Determination Beyond the FEC Threshold

Figure 2:
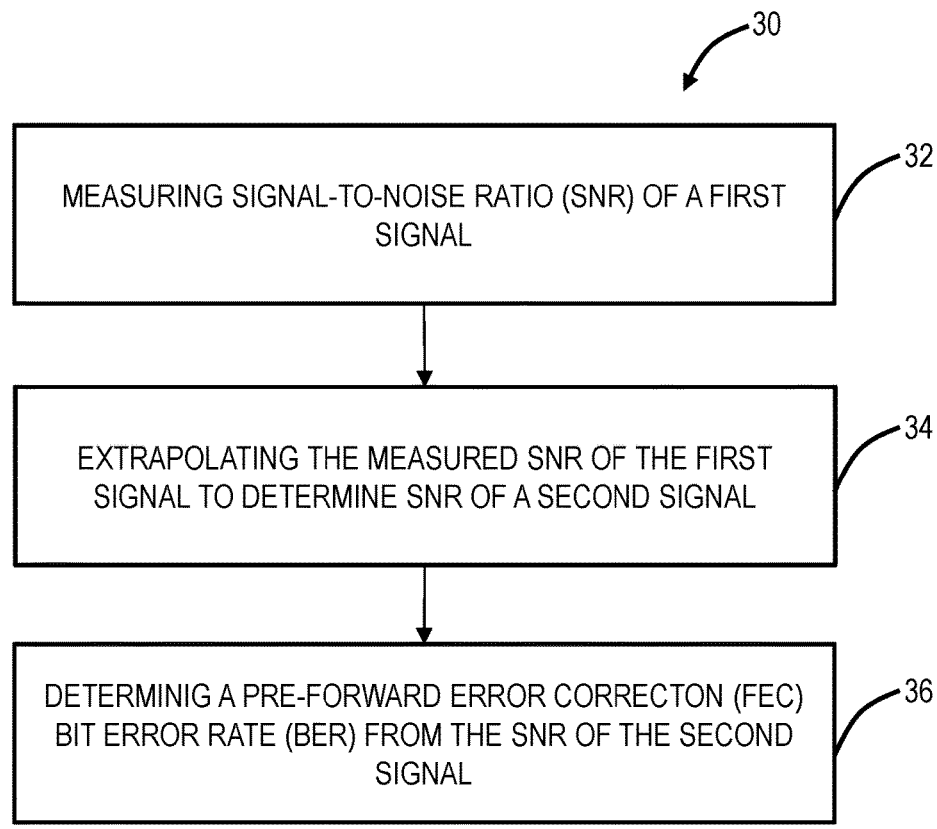
FIG. 2 is a flowchart of a process for determining BER from a SNR measurement, which can be used to provide an accurate determination of pre-FEC BER beyond the FEC threshold.

FIG. 2 is a flowchart of a process 30 for determining BER from a SNR measurement, which can be used to provide an accurate determination of pre-FEC BER beyond the FEC threshold. The process 30 can be implemented as a method having steps, via a receiver (either an optical or electrical receiver) configured to implement the steps, and via circuitry configured to implement the steps.

The process 30 includes measuring signal-to-noise ratio (SNR) of a first signal (step 32), extrapolating the measured SNR of the first signal to determine SNR of a second signal (step 34), and determining a bit error ratio (BER) from the SNR of the second signal (step 36). As noted above, above the FEC threshold, it is not accurate to determine or calculate the pre-FEC BER. As such, the present disclosure and the process 30 contemplates a measurement of SNR and extrapolation of that SNR to BER.

In a coherent optical signal, the first signal can be a pilot or training signal, and the second signal can be a data signal, that is operating above the FEC threshold. Details are described herein related to measuring the SNR of the pilot or training signal. Of note, the first signal, such as the pilot or training signal, supports a lower SNR than the second signal, i.e., the data signal. In the measuring step 32, pilot symbols are extracted from the received symbols and pilot SNR is measured from the received pilot symbols. So, once the SNR is measured of pilot or training signal, the present disclosure can provide an accurate pre-FEC BER of the data signal, from the measured SNR of the pilot or training signal and from an extrapolated SNR for the data signal. The extrapolating step 34 takes into account any difference in the transmitted power between pilots and data symbols and yields a corresponding data SNR from the measured pilot SNR.

The determining step 36 is a theoretical SNR to BER conversion for the modulation format in use (e.g., 16-QAM). Those skilled in the art will recognize there are known techniques to take a measured SNR and provide a BER based thereon. The technique is based on calculations that are based on a type of modulation format. This calculation can be based on analytical formulas, look up tables, or other methods.

Also, it is possible to measure other aspects of the pilot or training signal, namely CD, DGD, PDL, etc.

In an electrical signal, such as a PAM signal, the first signal and the second signal can be the same and the measurement can measure the SNR of the received electrical signal. For example, in PAM4, the SNR can be measured from a histogram of the received signal. Once the SNR is determined, the pre-FEC BER can be determined based on the measured SNR.

Measuring SNR of a Pilot Signal

Figure 3:
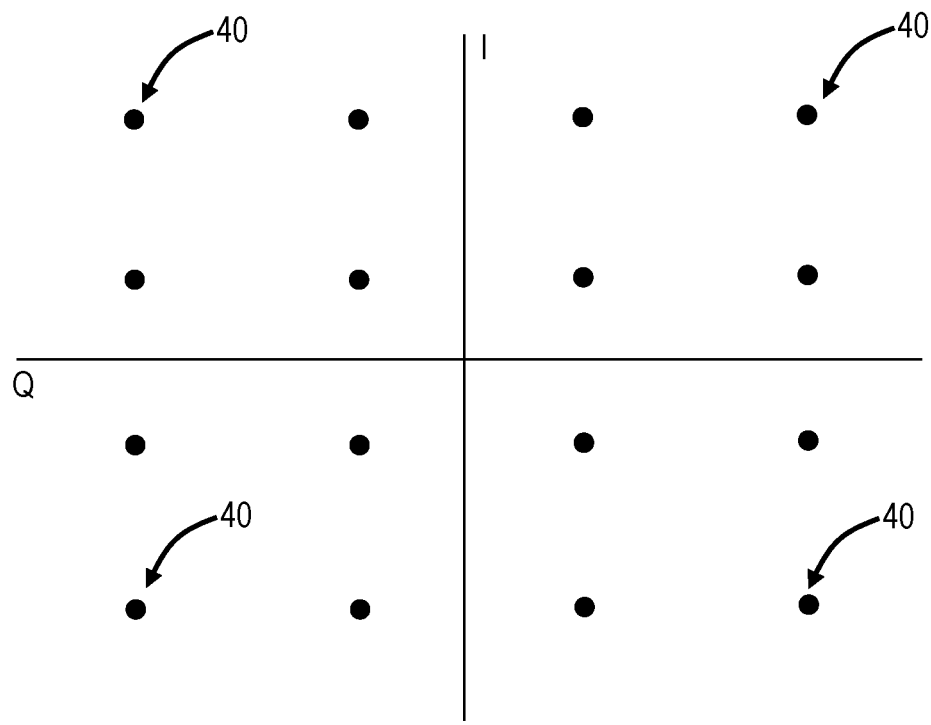
FIG. 3 is a graph of a 16-quadrature amplitude modulation (QAM) constellation.
Figure 4:
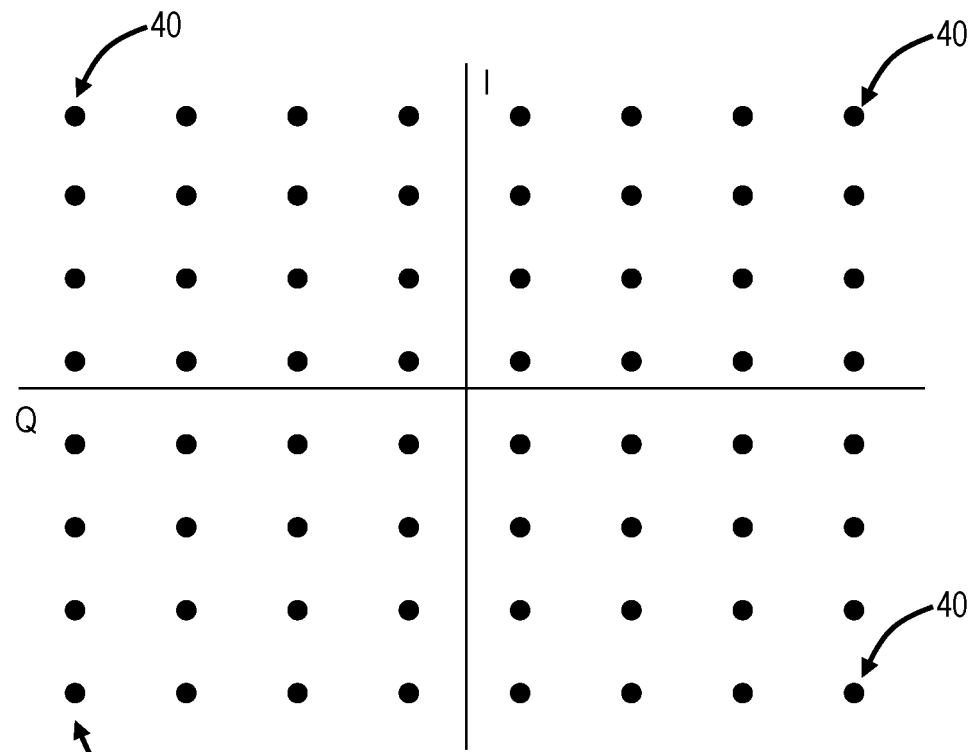
FIG. 4 is a graph of a 64-QAM constellation.

FIG. 3 is a graph of a 16-quadrature amplitude modulation (QAM) constellation. FIG. 4 is a graph of a 64-QAM constellation. As is known in the art, coherent modulation includes transmission of symbols, namely 16 symbols in 16-QAM, each representing four bits, and 64 symbols in 64-QAM, each representing six bits. Each symbol is represented by a dot in the graphs of FIGS. 3 and 4. Of note, due to noise, non-linear effects, etc., in the optical link 10, the symbols can spread out, leading to bit errors.

The pilot or training signal uses a subset of the symbols in the constellation. The pilot or training signal is used to establish a frame lock, to train a digital signal processor (DSP) on the received signal, etc. That is, the pilot or training signal is a normal aspect of a coherent optical link. Importantly, since the pilot or training signal for a coherent constellation uses a subset of the constellation points (such as using only the outer 4 points of a 16-QAM constellation), they can be acquired at low SNR and will have a lower BER than the full data constellation. For example, the subset of the constellation points can be outer points 40 in the 16-QAM constellation and the 64-QAM constellation. That is, it is possible to measure SNR of the optical link above the FEC threshold. In order to calculate the BER of the full data, the SNR of the pilot or training signal is scaled to the effective SNR of the full data constellation. This data SNR is then translated into BER using knowledge of the SNR to BER conversion for the operating mode. Note that this will be different for different operating modes.

The process 30 includes an SNR measurement to get a BER estimate beyond the FEC threshold, since it is not possible to calculate the BER beyond the FEC threshold. For coherent optical interfaces, pilot and training symbols for the pilot or training signal are inserted periodically to allow robust framing. In order to frame at low SNR values, these pilot and training symbols are defined as a subset of symbols which can tolerate a low SNR.

For example, the OIF 400ZR IA uses a 16-QAM constellation to encode 4 bits of data per polarization, but a quadrature phase shift keying (QPSK) constellation to allow the pilot and training symbols to acquire lock at a lower SNR than the FEC. A QPSK constellation is just four symbols, one in each quadrant.

Figure 5:
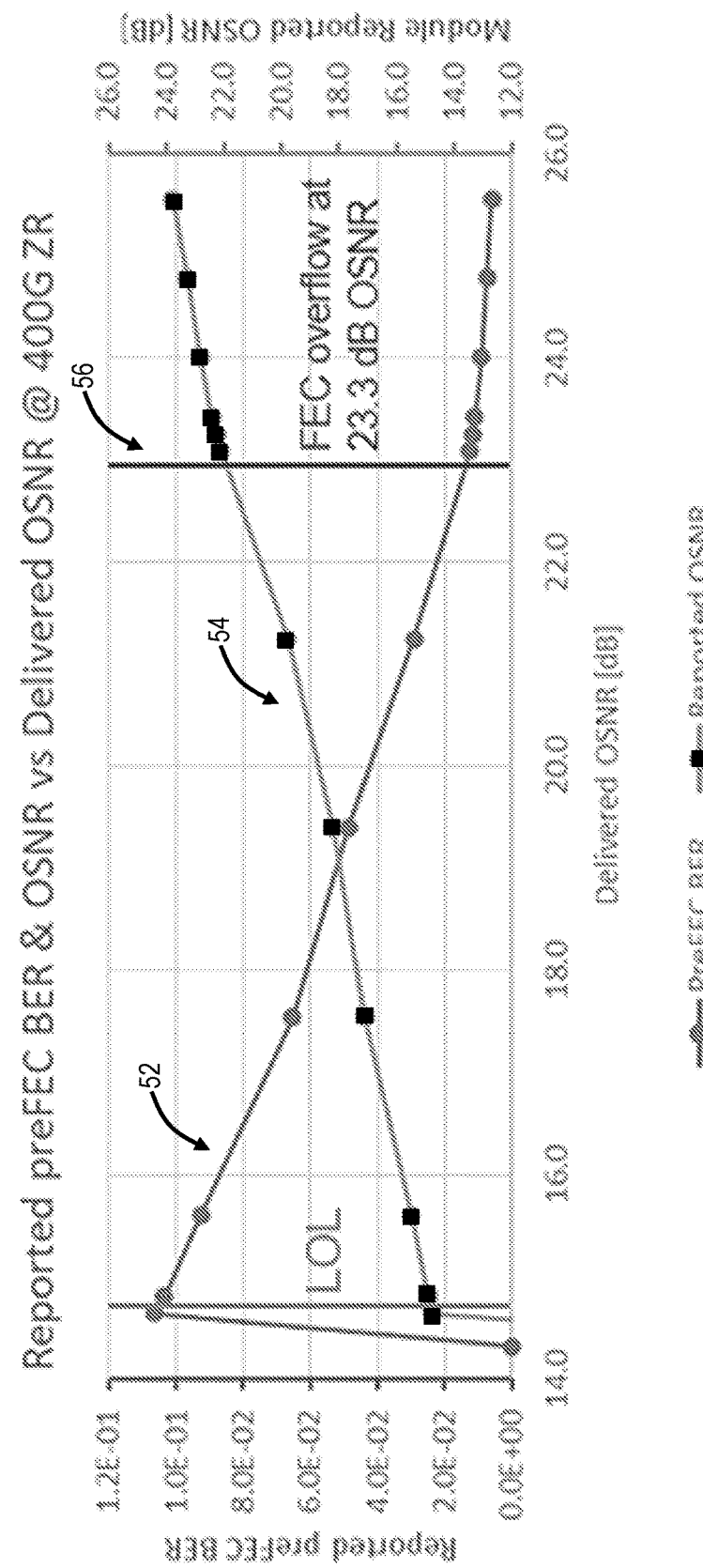
FIG. 5 is a graph of pre-FEC BER and optical signal-to-noise ratio (OSNR) for a 400G ZR optical interface.

FIG. 5 is a graph of pre-FEC BER and optical signal-to-noise ratio (OSNR) for a 400G ZR optical interface. The graph includes delivered OSNR (in dB) on the x-axis. This means the actual OSNR over the optical link 10. The graph includes a line 52 of pre-FEC BER which shows pre-FEC BER (on the left side y-axis) vs. the delivered OSNR. The graph further includes a line 54 of reported OSNR (on the right side y-axis) vs. the delivered OSNR. In this example, the FEC threshold is at 23.3 dB OSNR, noted by a line 56.

Note, on the right side of the line 56, the FEC corrects all errors and the pre-FEC BER can be calculated/determined normally. On the left side of the line 56, the FEC is overflowed, unable to correct all of the errors. The process 30 can provide the pre-FEC BER based on the measurement of SNR. That is, the graph shows an example measurement of estimated Pre-FEC BER and OSNR, before and after FEC overflow. Before FEC overflow, the Pre-FEC BER and OSNR is estimated using the FEC decoder. The pre-FEC BER and OSNR after FEC overflow is the focus of the process 30.

Note, the pilot or training signal can be measured up until loss of lock (LOL). LOL is where the pilot or training signal is no longer received error free.

Polarization Multiplexing

As known in the art, coherent modulation on the optical link 10 typically includes polarization multiplexing where an optical signal is modulated on both a horizontal (X) and vertical (Y) polarizations. Also, the FEC is distributed across both the polarizations. Because the FEC is distributed across the polarizations, typically only an aggregate BER is calculated. Using SNR to calculate BER, in the process 30, allows the two polarizations to have their BER independently calculated. Since the standards specifications and typical use cases are for the aggregate BER, the SNR's of the two polarizations can be combined to determine the overall BER.

Figure 6:
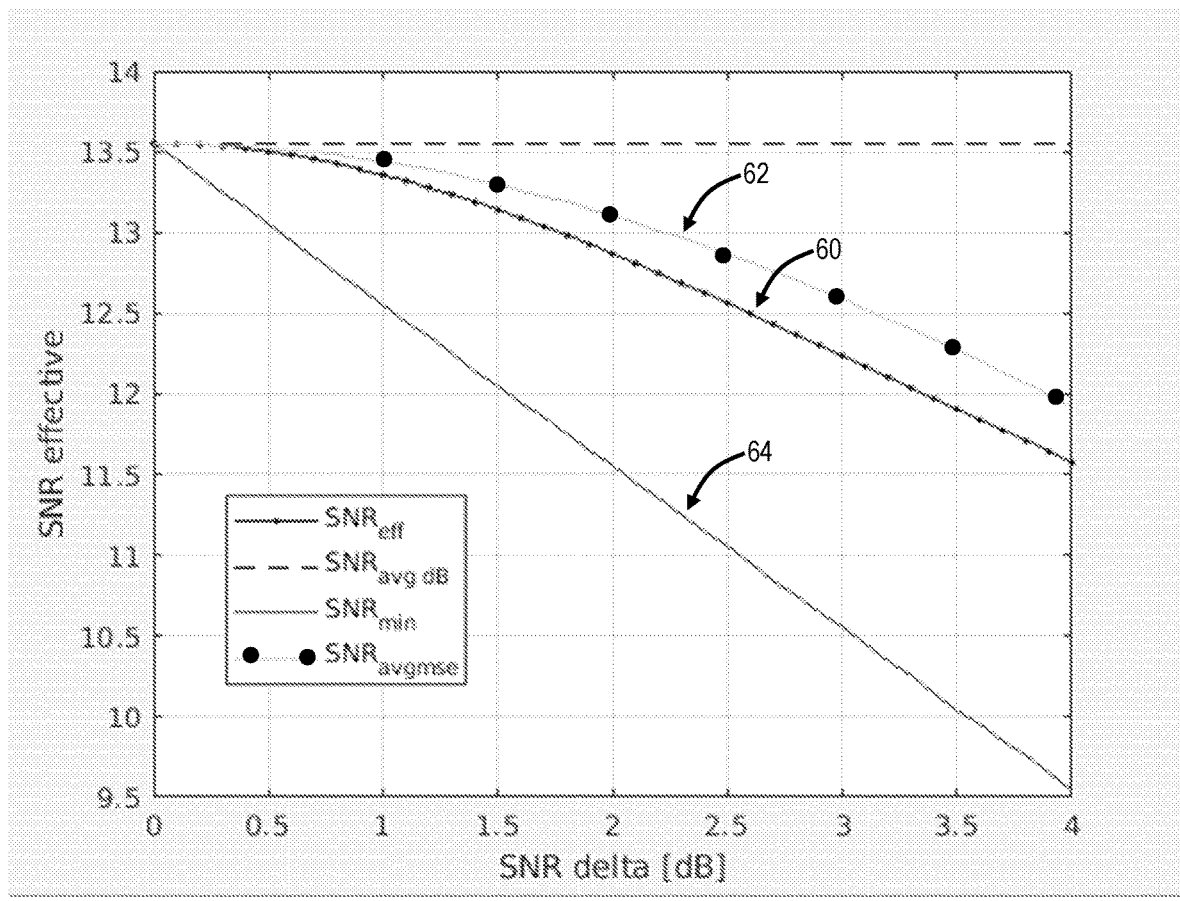
FIG. 6 is a graph of effective SNR vs. SNR delta for illustrating the SNR between the two polarizations in an example.

FIG. 6 is a graph of effective SNR vs. SNR delta for illustrating the SNR between the two polarizations in an example. Assume in this example:

X polarization has SNR=13.55 dB+delta
Y polarization has SNR=13.55 dB−delta

A line 60 is the effective SNR which is the result of combining the BER from both polarization—it is the true answer. A line 62 is the SNR avg mean squared error which is the result of adding the noise power from both polarizations—a good approximation to the line 60. A line 64 is the SNR min which is the results of taking the min SNR over both polarizations, a poor estimate.

Electrical Interface

Figure 7:
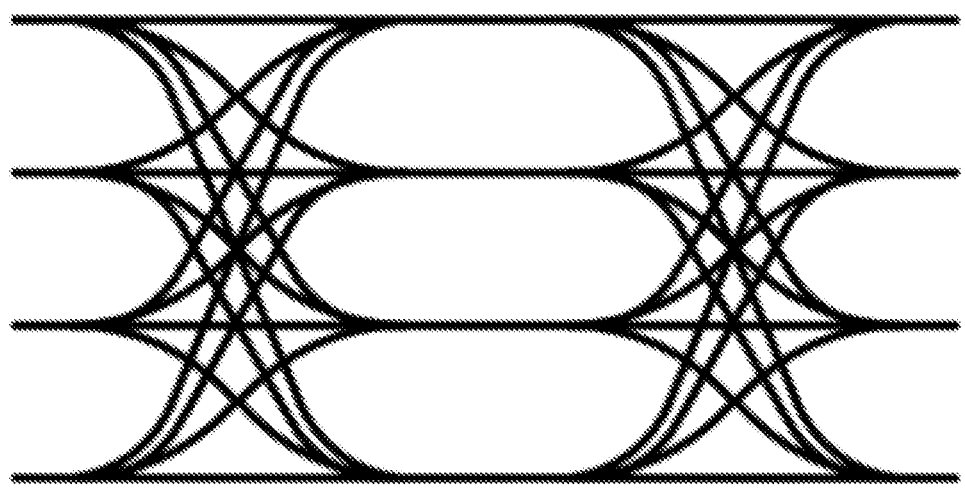
FIG. 7 is a graph of an eye diagram of an electrical pulse amplitude modulation with 4 levels (PAM4).

Electrical interfaces also use FEC to improve their performance. SNR for an electrical interface can be estimated based on histograms of the levels. These histograms can be measured on either side of the FEC threshold. FIGS. 7 and 10 are a graph of an eye diagram (FIG. 7) and a histogram (FIG. 10) of an electrical pulse amplitude modulation with 4 levels (PAM4). It is possible to determine the SNR based on the histograms and to use the process 30 to then determine the pre-FEC BER. In some embodiments, the same FEC is shared between the optical link 10 and the electrical link 12. Here, only a portion of the available FEC coding gain is applied to the electrical interface, and since the FEC may not be terminated after the electrical interface, the BER from this interface is not directly measured. Using SNR as a BER estimate can provide an approach to determine if the BER from the electrical interface is within the allocation.

Standards defined in OIF and IEEE 802.3 are moving to concatenated FEC architectures in which an end-to-end FEC is enhanced by an inner FEC to improve performance. In these implementations a portion of the overall FEC is allocated to electrical interfaces, with the remainder allocated as an outer code for the optical link. In these scenarios having knowledge of the electrical FEC for each segment to enhance fault isolation will become increasingly important. Additionally, standards such as IEEE 802.3 specify a BER allocation to electrical interfaces. Using an SNR to BER conversion provides a means to verify if the electrical link is meeting the defined BER allocated to it. This can be applied in any link having interfaces at which FEC is unterminated.

In Concatenated FEC implementations, the inner FEC may be terminated at a different interface than the outer FEC. In these scenarios the BER of the inner FEC can not be measured using conventional error-counting techniques. The SNR to BER approach allows a means of measuring the BER of the link covered by the inner FEC.

Process

Figure 8:
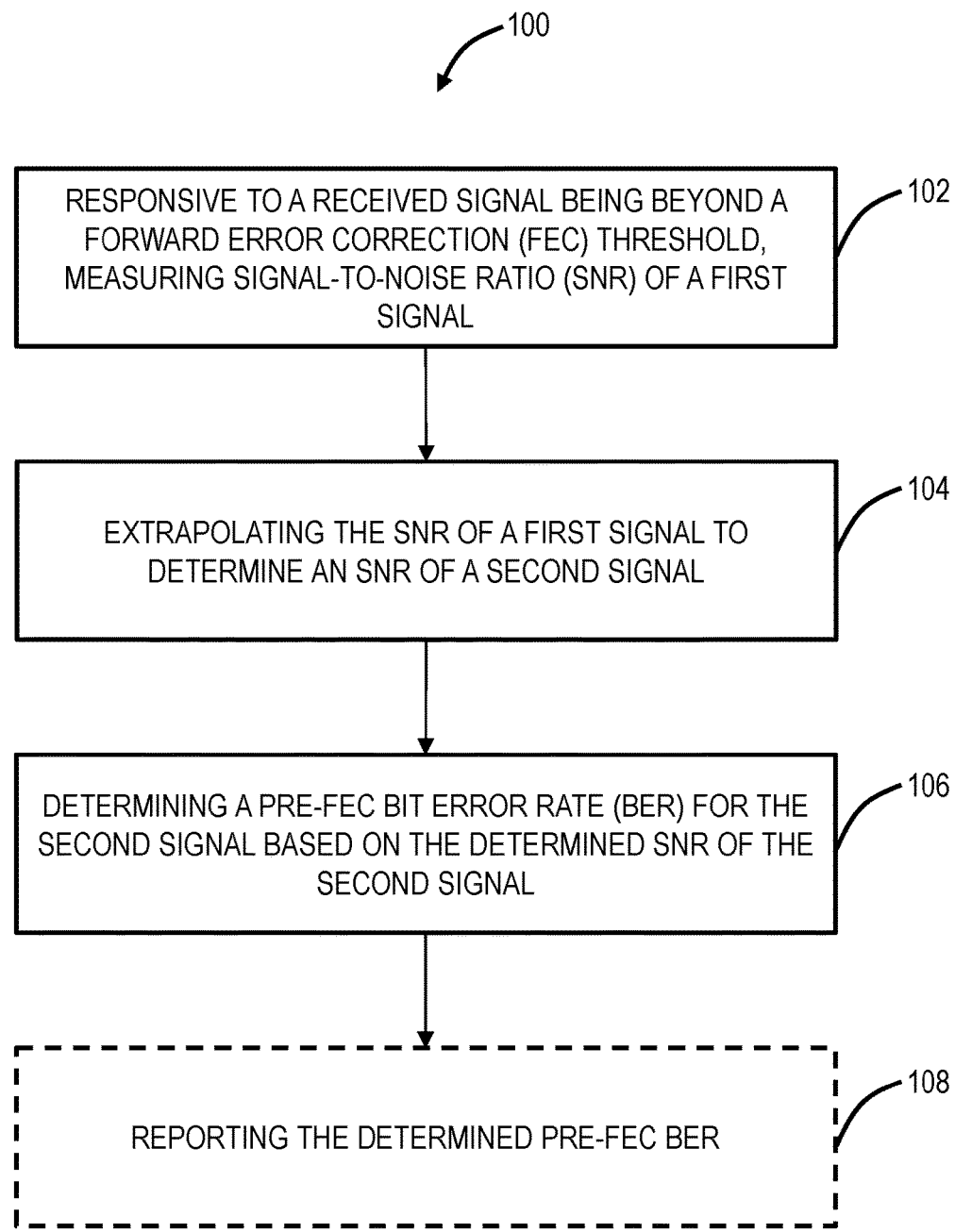
FIG. 8 is process of signal-to-noise ratio (SNR)-based bit error rate calculations for reporting beyond a forward error correction threshold.

FIG. 8 is process 100 of signal-to-noise ratio (SNR)-based bit error rate calculations for reporting beyond a forward error correction threshold. The process 100 can be implemented as a method having steps, via a receiver (either an optical or electrical receiver) configured to implement the steps, and via circuitry configured to implement the steps. For example, the process 100 can be implemented at the receiver 16 or at a receiver associated with the backplane 18, and associated circuitry therein.

The process 100 includes measuring signal-to-noise ratio (SNR) of a first signal (step 102); extrapolating the SNR of a first signal to determine an SNR of a second signal (step 104); and determining a pre-FEC bit error rate (BER) for the second signal based on the determined SNR of the second signal (step 106). The process 100 can further include reporting the determined pre-FEC BER (step 108). Note, the process 100 can be used when the second signal is beyond a forward error correction (FEC) threshold.

The process 100 can further include determining an estimate of optical link parameters including any of chromatic dispersion (CD), polarization dependent loss (PDL), and differential group delay (DGD) of the first signal; and reporting the estimate of optical link parameters.

The process 100 can further include, responsive to the determined pre-FEC BER being at or near the FEC threshold, reporting the determined pre-FEC BER and one or more adjustments to perform to attempt to reach or operate below the FEC threshold.

The received signal is a coherent optical signal, the first signal is a pilot or training signal associated with the coherent optical signal, and the second signal is a data signal for the coherent optical signal. The pilot or training signal has a reduced number of symbols from the data signal. The coherent optical signal can include two polarizations including an X polarization and a Y polarization, and the process 100 can further include determine the pre-FEC BER for each of the two polarizations, and one or more (1) combine the pre-FEC BER for each of the two polarizations and (2) report each of the pre-FEC BER for each of the two polarizations.

The received signal can be an electrical signal utilizing pulse amplitude modulation (PAM), and the first signal and the second signal are both the electrical signal. The received signal can be an electrical signal, and the measured SNR is from a histogram of a received electrical signal. The process 100 can further include, responsive to a received signal being below the FEC threshold, determine the pre-FEC BER based on total received bits and total corrected errors.

In addition to using the SNR of a first signal to measure the BER of a second signal, the SNR of the first signal can also be used to calculate other SNR metrics of the second signal, such as eSNR, MER, EVM, and other standards-defined metrics.

Concatenated FEC Example

Figure 9:
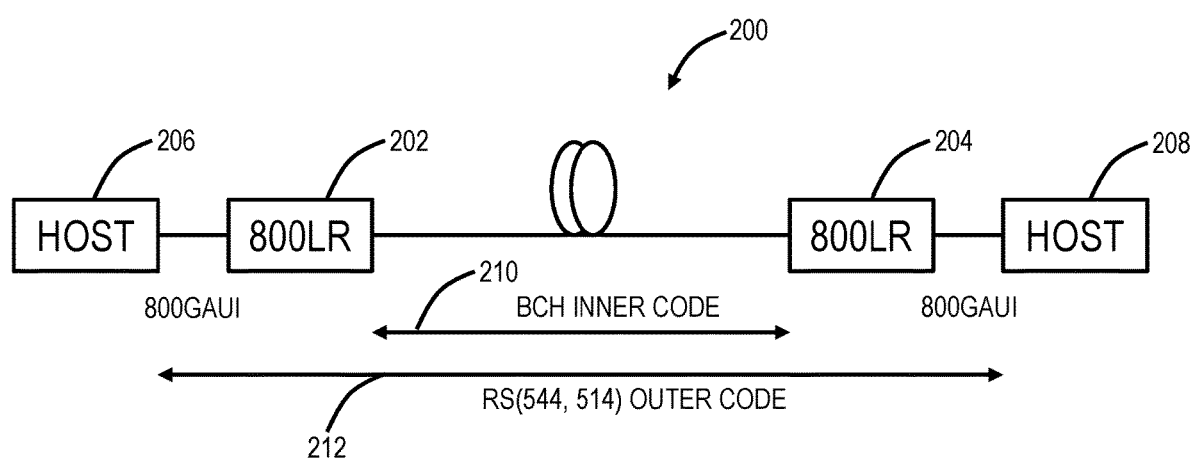
FIG. 9 is a diagram of another communication link with concatenated FEC.

FIG. 9 is a diagram of another communication link 200 with concatenated FEC. Specifically, the process 10 can be used to estimate the BER of an Inner code in a concatenated FEC scheme, as in FIG. 9. To illustrate a concatenated FEC scheme, the communication link 200 includes two 800LR modules 202, 204 connected to one another over a fiber link. Two host devices 206, 208 are connected to one another via the 800LR modules 202, 204. For example, the 800LR modules 202, 204 can be pluggable modules in the host devices 206, 208, which can be routers, switches, network devices, etc. The 800LR modules 202, 204 can utilize a BCH inner code, and the host devices 206, 208 can use a RS(544, 514) outer code.

In these schemes, the inner code may not fully correct all errors and cannot always calculate BER based on bit-error counts. Again, specs for the Inner code are based on BER, so monitoring is useful. These concatenated codes are being implemented both for direct detect and for coherent in IEEE and OIF.

SNR to BER Conversion

Those skilled in the art will understand there are various equations and approaches for determining BER from SNR, all of which are contemplated herewith. There are simplified expressions for QPSK, 16QAM, etc. to convert an SNR value to BER. For amplitude modulation, such as PAM-N interfaces, one such example is described in Kyongkuk Cho and Dongweon Yoon, "On the general BER expression of one- and two-dimensional amplitude modulations," in IEEE Transactions on Communications, vol. 50, no. 7, pp. 1074-180 July 2002, doi: 10.1109/TCOMM.2002.800818, the contents of which are incorporated by reference.

PAM SNR Measurement

FIG. 10 is a diagram of a PAM4 amplitude histogram and approach for determining SNR therefrom. FIG. 10 is FIG. 7.2 from the OIF Implementation Agreement, Common Management Interface Specification (CMIS), Revision 5.2, OIF-CMIS-05.2, Apr. 27, 2022, the contents of which are incorporated by reference. The histogram represents the distribution from the eye diagram of FIG. 7. This describes how to estimate/determine SNR from a PAM histogram. Once SNR is determined, the above approaches can be used to determine BER based thereon.

Transceiver

In an embodiment, the present disclosure includes a transceiver module with circuitry configured to implement the various techniques described herein. The transceiver module can be a coherent optical modem, a pluggable optical module, a coherent pluggable optical module, a line card, an electrical transceiver, a pluggable electrical transceiver, and the like. That is, the present disclosure contemplates any physical embodiment of a transceiver, electrical or optical. As described herein, the present disclosure enables reporting of BER, SNR, and other metrics even after a signal is beyond the FEC threshold.

The transceiver can include circuitry configured to receive and process a signal with forward error correction (FEC), measure or determine the pre-FEC bit error ratio (BER), wherein the pre-FEC BER is measured in a first regime above a FEC threshold and determined in a second regime below the FEC threshold, and provide the pre-FEC BER for reporting. The transceiver can utilize coherent modulation where the pre-FEC BER is determined in the second regime based on measuring a constellation BER where the constellation is smaller than a constellation of the signal and extrapolating the pre-FEC BER therefrom.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections may include headers for various embodiments and those skilled in the art will appreciate these various embodiments may be used in combination with one another as well as individually. Further, it is noted that the various elements, operations, steps, methods, processes, algorithms, functions, techniques, etc. described herein can be used in any and all combinations with one another.

What is claimed is:

1. A receiver comprising circuitry configured to:
   receive a signal,
   measure signal-to-noise ratio (SNR) of a first signal, wherein the first signal is a pilot or training signal associated with the received signal,
   extrapolate the SNR of the first signal to determine an SNR of a second signal, wherein the second signal is a data signal for the received signal, and
   determine a pre-forward error correction (FEC) bit error ratio (BER) for the second signal based on the determined SNR of the second signal, wherein the SNR is measured of the first signal and extrapolated to the second signal responsive to
   the second signal being beyond a FEC threshold.

2. The receiver of claim 1, wherein the circuitry is further configured to report the determined pre-FEC BER.

3. The receiver of claim 1, wherein the circuitry is further configured to
   determine an estimate of optical link parameters including any of chromatic dispersion (CD), polarization dependent loss (PDL), and differential group delay (DGD) of the first signal, and
   report the estimate of optical link parameters.

4. The receiver of claim 1, wherein the circuitry is further configured to
   responsive to the determined pre-FEC BER being at or near the FEC threshold, report the determined pre-FEC BER such that one or more adjustments are performed to attempt to reach or operate below the FEC threshold.

5. The receiver of claim 1, wherein the first signal includes a concatenated FEC with the pre-FEC BER being a measurement associated with an inner code of the concatenated FEC.

6. The receiver of claim 1, wherein the received signal is a coherent optical signal.

7. The receiver of claim 6, wherein the pilot or training signal has a reduced number of symbols from the data signal.

8. The receiver of claim 6, wherein the coherent optical signal includes two polarizations including an X polarization and a Y polarization, and wherein the circuitry is further configured to
   determine the pre-FEC BER for each of the two polarizations, and
   one or more (1) combine the pre-FEC BER for each of the two polarizations and (2) report each of the pre-FEC BER for each of the two polarizations.

9. The receiver of claim 1, wherein the received signal is an electrical signal utilizing pulse amplitude modulation (PAM), and the first signal and the second signal are both the electrical signal.

10. The receiver of claim 1, wherein the received signal is an electrical signal, and the measured SNR is from a histogram of a received electrical signal.

11. The receiver of claim 1, wherein the circuitry is further configured to
    responsive to the second signal being below the FEC threshold, determine the pre-FEC BER based on total received bits and total corrected errors.

12. A method comprising steps of:
    receiving a signal,
    measuring signal-to-noise ratio (SNR) of a first signal, wherein the first signal is a pilot or training signal associated with the received signal;
    extrapolating the SNR of the first signal to determine an SNR of a second signal, wherein the second signal is a data signal for the received signal; and
    determining a pre-forward error correction (FEC) bit error ratio (BER) for the second signal based on the determined SNR of the second signal, wherein the SNR is measured of the first signal and extrapolated to the second signal responsive to
    the second signal being beyond a FEC threshold.

13. The method of claim 12, wherein the steps further include reporting the determined pre-FEC BER.

14. The method of claim 12, wherein the steps further include
    determining an estimate of optical link parameters including any of chromatic dispersion (CD), polarization dependent loss (PDL), and differential group delay (DGD) of the first signal; and
    reporting the estimate of optical link parameters.

15. The method of claim 12, wherein the steps further include
  responsive to the determined pre-FEC BER being at or near the FEC threshold, reporting the determined pre-FEC BER and one or more adjustments to perform to attempt to reach or operate below the FEC threshold.

16. The method of claim 12, wherein the received signal is a coherent optical signal.

17. The method of claim 16, wherein the coherent optical signal includes two polarizations including an X polarization and a Y polarization, and wherein the steps further include
  determine the pre-FEC BER for each of the two polarizations, and
  one or more (1) combine the pre-FEC BER for each of the two polarizations and (2) report each of the pre-FEC BER for each of the two polarizations.

\* \* \* \* \*